(12) United States Patent
Barics et al.

(10) Patent No.: US 12,043,765 B2
(45) Date of Patent: *Jul. 23, 2024

(54) CONTAINER FOR A CONSUMABLE GOOD, COATED WITH ANTIOXIDANT-CONTAINING LAYER

(71) Applicant: IP 2 INTELLIGENT PACKAGING (GERMANY) UG (HAFTUNGSBESCHRANKT), Munich (DE)

(72) Inventors: Steven John Anthony Barics, Victoria (AU); Gregory John Charles Stokes, Victoria (AU)

(73) Assignee: IP 2 INTELLIGENT PACKAGING (GERMANY) UG (HAFTUNGSBESCHRANKT), Munich (DE)

( * ) Notice: Subject to any disclaimer, the term of this patent is extended or adjusted under 35 U.S.C. 154(b) by 121 days.

This patent is subject to a terminal disclaimer.

(21) Appl. No.: 17/466,378

(22) Filed: Sep. 3, 2021

(65) Prior Publication Data

US 2021/0395541 A1 Dec. 23, 2021

Related U.S. Application Data

(62) Division of application No. 15/538,714, filed as application No. PCT/EP2015/081151 on Dec. 23, 2015, now Pat. No. 11,124,661.

(30) Foreign Application Priority Data

Dec. 23, 2014 (EP) ..................................... 14200165

(51) Int. Cl.
*C09D 7/63* (2018.01)
*B65D 1/48* (2006.01)
*B65D 25/14* (2006.01)
*B65D 81/28* (2006.01)
*C08K 5/13* (2006.01)
*C09D 5/00* (2006.01)
*C09D 5/02* (2006.01)

(52) U.S. Cl.
CPC ............... *C09D 7/63* (2018.01); *B65D 25/14* (2013.01); *B65D 81/28* (2013.01); *C08K 5/13* (2013.01); *C09D 5/00* (2013.01); *C09D 5/024* (2013.01); *B65D 1/48* (2013.01)

(58) Field of Classification Search
CPC ................................. B65D 25/14; B65D 81/28
See application file for complete search history.

(56) References Cited

U.S. PATENT DOCUMENTS

| | | | | |
|---|---|---|---|---|
| 2,233,141 A | * | 2/1941 | Musher | D21H 21/36 427/415 |
| 2006/0198995 A1 | * | 9/2006 | Nideborn | B32B 27/32 524/110 |
| 2016/0376446 A1 | * | 12/2016 | Gibanel | B65D 25/14 428/35.8 |

FOREIGN PATENT DOCUMENTS

WO WO2010/016034 * 2/2010 ............. C01B 33/44

OTHER PUBLICATIONS

English machine translation for JP09-012785A. (Year: 1997).*

* cited by examiner

*Primary Examiner* — Michael C Miggins
(74) *Attorney, Agent, or Firm* — Scott R. Cox

(57) ABSTRACT

The present invention relates to a container for a consumable good having an inner coating layer comprising antioxidant, a process for preparing such a container, and the use of said container for the storage of a consumable good, and the use of an antioxidant as an additive to coating layers of such containers.

20 Claims, No Drawings

CONTAINER FOR A CONSUMABLE GOOD, COATED WITH ANTIOXIDANT-CONTAINING LAYER

CROSS-REFERENCE TO RELATED APPLICATIONS

This application is a divisional application based on U.S. application Ser. No. 15/538,714 filed Jun. 22, 2017, now U.S. Pat. No. 11,124,661 issued Sep. 21, 2021, which was filed as a 371 US National State of International Application No. PCT/EP2015/081151, filed Dec. 23, 2015, which claimed priority of EP 14200165.0, filed Dec. 23, 2014, the disclosures of which are herein incorporated by reference in their entirety.

TECHNICAL FIELD

The present invention relates to a container comprising an antioxidant-containing layer, in particular towards the inside of the container. The container is in particular to be filled with a consumable good, in particular food, beverage or other comestibles, personal care or pharmaceutical products. It has in particular an inner coating layer comprising antioxidant. The invention further concerns a process for preparing such a container, the use of said container for the storage of a consumable good and the use of antioxidant as an additive to coating layers of such containers.

BACKGROUND OF THE INVENTION

Consumable goods have been stored in various containers over the centuries, including timber, animal skins, pottery and leather.

Alternative packaging forms such as metal containers, plastic containers such as those made of polyethylene (PE), polypropylene (PP), polyethylenetetraphthate (PET) or other polymers and mixtures thereof and paper or cardboard containers have increased in popularity in the past decade. These offer advantages of lower weight, however their properties are in many instances not suitable for long-term storage in particular of oxidation-sensitive goods.

Such oxidation sensitive goods are relevant in all fields of consumable goods (consumables), in particular comestibles such as food and beverages, but also pharmaceuticals products or drugs, medical and veterinary preparations, as well as cosmetic and personal care products. In many instances, a problem also arises from the relatively aggressive nature of the goods or products. These problems arise both for liquid and solid consumable goods. As result of the interaction between the product and container or compounds (such as oxygen) entering the container, the product quality is impaired and/or the life span and storage stability of the consumable good is reduced.

The development of a robust packaging system in particular for delicate products (consumable goods) is considered desirable so as to ensure product integrity, longevity and to meet consumer demands for sustainable packaging and the requirements of maintaining the quality of the goods under various global storage and transport conditions.

As the globalization and world market demand for consumable goods increases, there is a need to transport those goods globally while maintaining their integrity and stability. Additionally, given today's global economy, producers of consumable goods are forced to package their products in a number of countries around the world. These products become susceptible to a variety of local conditions at time of manufacture, including water quality and chemical content, weather conditions etc., all of which have significant potential to impact on product integrity, stability and longevity.

For example products such as wine that are extremely and continuously interactive with their environment require their internal chemical balance to be maintained in order for the products integrity to be delivered intact to the consumer as the winemaker had intended. With the global markets opening winemakers wish to deliver their products to the consumer globally the way they had made the wine. This is extremely difficult in a global market with its varying weather conditions, temperature fluctuations, quality and ability of logistics systems to maintain the wines' integrity until it reaches the consumer.

In addition, the need for an integrated wine packaging system and a product that delivers an exact equilibrium for global transport allowing the delivery of a wine that maintains its integral balance and profile from the winemaker to the consumer no matter where that consumer is located with a stable shelf (up to and well over 12 months) has been a long felt commercial requirement but is also environmentally friendly to minimize its overall carbon footprint.

As the world market demand for wine increases, there is a need to transport wine that maintains its integrity and safety globally with the additional use of a more environmentally sustainable beverage packaging. The need for the development of an integrated wine and beverage packaging system with a closed loop fully recyclable product capability of carrying a diverse product range globally through a variety of storage and transport conditions has emerged.

To meet the expectations of an increasingly environmentally aware consumer coupled with the desire for product integrity, aluminium containers without the risk of can taint are required in order for the consumer to confidently transition to this form of environmentally friendly packaging for a high value product such as wine over other less environmentally friendly packaging currently available.

Consumer assurance is reliant on factors such as the non 'tinny' taste (can taint) of products packaged in aluminium containers, shelf life stability and product integrity which need to be maintained by products packaged in aluminium containers.

Traditionally can manufacturers use lacquers to coat the inside of aluminium cans to form a barrier between the product and can body prior to being filled. These traditional lacquers are applied to the inside of a beverage can for the purpose of holding a beverage in aluminium container for a short period of between 3-6 months.

The current general process used by beverage can/container manufacturers to construct and apply a lacquer does not address the issue of wine and wine products shelf life stability and product integrity. Many manufacturers of beverage cans or other beverage containers are faced with product integrity deterioration, some of which include flavour profile degradation, loss of freshness, changes to the taste, aroma and colour of the products and can coating failures leading to pin holing and spoilage. Finally internal product collapse may occur, further damaging the reputation of the aluminium container as a premium beverage container and environmental alternative.

It is generally recognized in the industry that wine and wine products are known to suffer product breakdown—with loss of product integrity, over a short period of time (6 months) when filled in cans/can bottles etc. using current regular lacquers. Beverage can manufacturers own internal guidelines recommend only 6 months as a stable shelf life and after that it is guess work based on the individual product by product time test evaluation.

Aluminium beverage container manufacturers receive significant consumer complaints that canned beverages taste "tinny", "oxidized" or "off", "lacking in flavour" or "dull tasting". This is because the product itself has suffered loss of integrity via the interaction of the product with the coating and aluminium container through the breakdown of the coating or even to some extent the lacquer. This leads to the consumer perception that products produced in aluminium containers are inferior, particularly for high value products such as wine when the consumer compares the same wine that is in glass packaging.

The perceived taste difference causes a negative view of the aluminium containers potential to deliver wine and wine based products with integrity and consistent quality. This has a knock on effect as glass is not as recyclable as aluminium and therefore has a greater negative impact on the environment.

In today's competitive market, manufacturers look at ways of reducing costs and staying competitive in the marketplace. Beverage manufactures demand lower priced packaging options from their suppliers, forcing can manufacturers to use the least amount of aluminium and lacquer to deliver a competitive product to their customers.

Since the mid-nineties there has been a significant shift towards the use of thinner gauged aluminium for the manufacture of aluminium cans. Aluminium beverage container manufacturers look at various ways to reduce the cost of aluminium beverage containers and one way of achieving this is to reduce the aluminium gauge of the aluminium rolls used to manufacture the cans.

This move to thinner gauged aluminium reduces overall costs while also decreasing the amount of metal and energy required to produce a can. However, the thinner can presents a number of significant issues to the products they carry which are of great concern to can and beverage manufacturers and the consumer. It is more susceptible to exterior damage and also to lacquer damage during the manufacturing, filling, packing, storage, transport and throughout the entire supply chain process.

Handling of the product may result in damage via dents and depending on the position of these on the can, damage (cracking and fracturing) may also result to the internal can lacquer and subsequently expose the wine to the raw aluminium resulting in product contamination and spoilage. Such damage has the potential of destroying the entire shipment of the products through the leaking aluminium container infecting the surrounding products and causing significant financial losses.

Additionally, given today's global economy, beverage producers are forced to package their products in a number of countries around the world. These products become susceptible to a variety of local conditions at time of manufacture, including water quality and chemical content, weather conditions etc., all of which have significant potential to impact on product integrity, stability and longevity.

Principally the same or similar factors apply to the producers of all consumable goods such as beverages, food or also cosmetics, health care or beauty products, pharmaceutical products, medicaments and the like. Therefore, it is an object of the present invention to provide an advantageous container, in particular for a consumable good, such as for example a food, beverage or other comestilble, a personal care product or a pharmaceutical product, and to avoid the aforementioned problems of the prior art.

Furthermore, it is another object of the present invention to provide a process for preparing such a container, and the uses of such a container.

SUMMARY OF THE INVENTION

According to one aspect of this invention, a container, in particular for a consumable good is provided wherein the inner surface of the container is at least partially coated with a coating layer comprising antioxidant.

According to a broad aspect of the invention, it relates to a container comprising an antioxidant-containing layer, in particular towards the inside of the container. The container is in particular to be filled with a consumable good, in particular beverage, food or other comestibles, personal care or pharmaceutical products. It has in particular an inner coating layer comprising antioxidant.

In one embodiment of the invention, the container does not (yet) contain the consumable good, e.g. a beverage such as wine or a wine-based drink. Thus, one aspect of the invention refers to the container as produced before it is filled with the consumable good.

According to one aspect of the invention, consumable goods (or consumables) are goods that, (according to the 1913 edition of Webster's Dictionary) are capable of being consumed. Consumed shall mean spent or used in any way, e.g. as comestibles for nutrition, for personal care or health or beauty purposes, for pharmaceutical or veterinary purposes or in any other way.

According to one embodiment of the invention, consumable good is understood to comprise inter alia comestibles such as food, food ingredients, nutrients, nutrition supplements, beverages, as well cosmetic products, beauty and health care products, pharmaceutical and veterinary products, medicaments and the like. In general, the goods may comprise solid, liquid and/or gaseous components. Comestible is according to one embodiment is understood as something edible for humans or animals, i.e. something which is fit to be eaten. A non-limiting list of preferred food or food ingredients comprises solid food, liquid or liquefied food such as food—in both, baby food, (baby) formula powders and the like, food—in solid, such as canned food, precooked meals or dinners, e.g. canned fish, semi-solid state food such as meat, fruit or vegetables in juice or sauce, other food products or condiments, sauces, marinades, spices and the like. A non-limiting list of preferred pharmaceutical or veterinary products are medicaments in the form of tablets, capsules, granules, powders, liquids, other solid or liquid dosage forms, and the like. A non-limiting list of preferred cosmetic products or beauty and health care products comprises creams, lotions, soaps, emulsions, dispersions or liquids etc.

As used herein, "container" shall be broadly understood to comprise all kinds of containers or packagings (for consumable goods) in rigid or flexible form.

In one embodiment of the invention, the consumable good is a non-beverage consumable good.

In one embodiment of the invention, the consumable good is a wine or wine-based beverage.

In one embodiment of the invention, the consumable good is a food, beverage or other comestibles, a personal care or a pharmaceutical product.

In one embodiment of the invention, the personal care or a pharmaceutical product is in the form of a tablet, a capsule, a granulate, a powder, a liquid, a soap, a lotion or a cream, an emulsion, dispersion or solution or the like.

In another preferred embodiment, the inner surface of the container is integrally coated with a coating layer comprising antioxidant.

In yet another preferred embodiment, the coating layer comprises antioxidant in a concentration of at least 0.0001 weight %, preferably at least 0.001 weight %, more preferably at least 0.01 weight %, even more preferably at least 0.1 weight %, even more preferably at least 1.0 weight %.

In yet another preferred embodiment, the coating layer comprises antioxidant in a concentration of at most 30 weight %, preferably at most 10 weight %, more preferably at most 1 weight %, even more preferably at most 0.1 weight %, even more preferably at most 0.01 weight %.

In yet another preferred embodiment, the container is made of glass, metal, polymer material, paper, cardboard, or combinations thereof, in a more preferred embodiment of aluminium.

In yet another preferred embodiment, the thickness of the coating layer on the inner surface of the container is in the range of between about 3.5 to about 8.4 grams per square meter, in a more preferred embodiment in the range of about 4.0 to about 8.0 grams per square meter, in a most preferred embodiment in the range of about 5.0 to about 8.0 grams per square meter. In another embodiment, the thickness of the coating layer and/or container wall can be from about 0.1 μm to 10 mm, in particular from about 1 μm to 1 mm.

In another preferred embodiment, the coating layer does not contain epoxy resins, in a more preferred embodiment the coating layer does not contain bisphenol A or bisphenol A-releasing substances.

In yet another preferred embodiment, the coating layer is a thermoset coating layer.

In yet another preferred embodiment, at least one additional coating layer is present in the container, optionally between the coating layer comprising antioxidant and the container wall made of metal.

According to a further aspect of the present invention, a process is provided for preparing a container for a consumable good as defined above, the process comprising the steps of:
 a) providing a container having a container wall having an inner side facing inner space of the container;
 b) providing a coating layer on the inner side of the container wall, the coating layer containing antioxidant.

According to one embodiment, process step b) above comprises applying an uncured coating layer comprising antioxidant to a surface of a container wall material; and curing the uncured coating layer.

In one embodiment of the process, the uncured coating layer comprising antioxidant is applied to the surface of a container wall material before the container is formed.

In another embodiment of the process, the uncured coating layer comprising antioxidant is applied to the surface of a container wall material after the container is formed.

In yet another embodiment, the process comprises the additional step of filling the container with a consumable good as defined herein.

In a further embodiment, the consumable good is a food or comestible, a personal care or a pharmaceutical product.

According to a further aspect of the present invention, a container obtainable by the process of the present invention is provided.

Yet a further aspect of the present invention is directed to the container according to anyone of the aforementioned aspects or embodiments, further comprising a consumable good. In particular, a further aspect of the present invention is directed to the container according to anyone of the afore-mentioned aspects or embodiments, further containing or being filled with a consumable good.

According to a further aspect of the present invention, the use of a container according any of the afore-mentioned aspects or embodiments of the invention for the storage of a consumable good is provided.

According to a further aspect of the present invention, the use of antioxidant as an additive to a coating layer on the inner surface of a container for a consumable good is provided.

According to a preferred embodiment, wherein the consumable good is a food, beverage or other comestible, a personal care or a pharmaceutical product.

All embodiments and aspects as described and/or claimed herein are deemed to be combinable within the present invention, unless this is excluded by contradiction. In particular, the features embodiments relating to the container or its materials and the consumable goods are combinable and disclosed in any combination with any product, process or use aspect of the present invention.

DETAILED DESCRIPTION OF THE INVENTION

It has been surprisingly found that a container for a consumable good, wherein the inner surface of the container is at least partially coated with a coating layer comprising antioxidant provides excellent protection from the detrimental and undesired loss of quality, including the undesired consequences of the reaction between the consumable good and the packaging material, or the consumable good and a compound entering or present in the interior of the container.

As stated above, according to one embodiment of the invention, consumable good is understood to comprise inter alia food, food ingredients, nutrients, nutrition supplements, beverages, cosmetic products, beauty and health care products, pharmaceutical and veterinary products, medicaments and the like. In general, the goods may comprise solid, liquid and/or gaseous components. A non-limiting list of preferred beverages comprises wine or wine based products, soft drinks, fruit juices, milk or whey based drinks and the like. A non-limiting list of preferred food or food ingredients comprises solid food, liquid or liquefied food such as food—in both, baby food, (baby) formula powders and the like, food—in solid, such as canned food, precooked meals or dinners, e.g. canned fish, semi-solid state food such as meat, fruit or vegetables in juice or sauce, other food products or condiments, sauces, marinades, spices and the like. A non-limiting list of preferred pharmaceutical or veterinary products are medicaments in the form of tablets, capsules, granules, powders, liquids, other solid or liquid dosage forms, and the like. A non-limiting list of preferred cosmetic products, beauty and health care products comprises creams, lotions, soaps, emulsions, dispersions or liquids etc. Also included are personal care products or toiletries i.e. goods used in personal hygiene and for beautification. personal care products include without limitation lip balm, cleansing pads, colognes, deodorant, eye liner, lip gloss, lipstick, lotion, makeup, pomade, perfumes, talcum powder, shaving cream, skin cream, wet wipes etc. Also included are drugs and drug-containing compositions (pharmaceutical and veterinary products). A drug is, in the broadest of terms, a chemical substance that has known biological effects on humans or other animals.

According to one embodiment of the invention, the consumable good is a beverage, in particular a wine or a wine-based beverage. Herein, wine is understood to comprise any beverage which is obtained from viticulture and wine-making techniques as they are known in the art. In one preferred embodiment, the wine is a red wine. In another preferred embodiment, the wine is a white wine. In yet another preferred embodiment, the wine is a rose wine. The wine may be a still wine or a carbonated, sparkling wine. The wine may also be a fortified wine. A wine-based drink is understood to comprise any beverage which comprises a wine as defined above. As examples for wine-based drinks, wines blended with mineral water or fruit juice may be mentioned.

As used herein, "container" shall be broadly understood to comprise all kinds of containers or packagings (for consumable goods) in rigid or flexible form.

As used herein, "antioxidant" shall be understood as defined below. "Antioxidant" may refer to a one or more antioxidants, i.e. a single or more than one antioxidant compounds may be used.

According to one embodiment of the invention, the antioxidant is selected from one or more of the group consisting of vitamins, vitamins cofactors, hormones, carotenoid terpenoids, natural or synthetic phenols and polyphenols, such as flavonoids, phenolic acids and their esters and nonflavonoid phenolics or other organic antioxidants, and mixtures of the aforementioned.

According to a preferred embodiment of the invention, the antioxidant is selected from one or more of the group of vitamins, in particular the group consisting of vitamin A (retinol), beta-carotene, carotenoids, provitamin A, vitamin C (ascorbic acid), vitamin E, including tocotrienol and tocopherol. According to one preferred embodiment, the antioxidant is or comprises Vitamin E.

According to a preferred embodiment of the invention, the antioxidant is selected from one or more of the group of the (ten) forms of vitamin E. The ten forms of vitamin E are divided into two groups; five are tocopherols and five are tocotrienols. They are identified by prefixes alpha- ($\alpha$-), beta- ($\beta$-), gamma- ($\gamma$-), delta- ($\delta$-), and epsilon ($\epsilon$-). Natural tocopherols occur in the RRR-configuration only. The synthetic form contains eight different stereoisomers and is called 'all-rac'-$\alpha$-tocopherol.

According to a preferred embodiment of the invention, the antioxidant is selected from one or more of the group of retinol, retinal, retinoic acid, and provitamin A carotenoids such as beta-carotene, retinyl palmitate, retinyl acetate, retinol, retinal, alpha-carotene, beta-carotene, gamma-carotene, beta-cryptoxanthin and xanthophyll beta-cryptoxanthin.

According to another preferred embodiment of the invention, the antioxidant is selected from vitamin cofactors in particular coenzyme Q10.

According to another preferred embodiment of the invention, the antioxidant is selected from hormones, in particular melatonin.

According to another preferred embodiment of the invention, the antioxidant is selected from carotenoid terpenoids, in particular the group consisting of alpha-carotene, astaxanthin, beta-carotene, canthaxanthin, lutein, lycopene, zeaxanthin or mixtures thereof.

According to another preferred embodiment of the invention, the antioxidant is selected from polyphenols and phenols, particularly natural phenols and polyphenols found in plants.

According to a preferred embodiment, the antioxidant is or comprises at least one of the group of stilbenoids, in particular excluding resveratrol. Stilbenoids are hydroxylated derivatives of stilbene. They have a C6-C2-C6 structure. In biochemical terms, they belong to the family of phenylpropanoids. According to another preferred embodiment, the antioxidant is or comprises at least one of the group of Piceatannol, Pinosylvin, Pterostilbene, Astringin and Piceid.

According to a preferred embodiment, the antioxidant is or comprises at least one of the group of flavonoids, in particular catechins. According to another preferred embodiment, the antioxidant is or comprises at least one of the group of (+)-Catechin (CAS 154-23-4), (−)-Epicatechin (CAS 490-46-0), (+)-Gallocatechin (CAS 970-73-0), (−)-Epigallocatechin (CAS 970-74-1), (−)-Robinetinidol, (+)-Fisetinidol, (−)-Fisetinidol, (+)-Afzelechin, (+)-Epiafzelechin and (−)-Epiafzelechin.

According to another preferred embodiment of the invention, the antioxidant is selected from flavonoids, in particular selected from one or more of the group consisting of flavones such as apigenin, luteolin, tangeritin, flavonols such as isorhamnetin, kaempferol, myricetin, proanthocyanidins, or condensed tannins, quercetin and rutin, flavanones such as eriodictyol, hesperetin, hesperidin, naringenin, naringin, flavanols and their polymers such as catechin, gallocatechin and their corresponding gallate esters, epicatechin, epigallocatechin and their corresponding gallate esters, theaflavin its gallate esters, thearubigins, isoflavone phytoestrogens such as daidzein, genistein or glycitein, stilbenoids such as pterostilbene, anthocyanins such as cyanidin, delphinidin, malvidin, pelargonidin, peonidin, petunidin.

According to another preferred embodiment of the invention, the antioxidant is selected from one or more of the group consisting of phenolic acids and their esters such as chicoric acid, chlorogenic acid, cinnamic acid and its derivatives, such as ferulic acid, ellagic acid, ellagitannins, gallic acid, gallotannins, rosmarinic acid, salicylic acid.

According to another preferred embodiment of the invention, the antioxidant is selected from other nonflavonoid phenolics such as curcumin, flavonolignans such as silymarin, xanthones like mangostin, eugenol, and mixtures thereof.

According to another preferred embodiment of the invention, the antioxidant is selected from other organic antioxidants, selected from the group of capsaicin, bilirubin, phytic acid, N-acetylcysteine, R-$\alpha$-lipoic acid, uric acid, and mixtures thereof.

According to a preferred embodiment of the invention, at least one other antioxidant apart from resveratrol is used.

According to one aspect, the resveratrol shall be understood in its broadest form, in particular, it comprises cis-resveratrol as well as trans-resveratrol (cis-form: 3,5,4'-trihydroxy-cis-stilbene; trans-form: 3,5,4'-trihydroxy-trans-stilbene).

According to a preferred embodiment of the invention, the antioxidant is not or does not comprise resveratrol.

According to a preferred embodiment of the invention, the antioxidant(s) used have a L-ORAC, H-ORAC or Total-ORAC value which is at least 10%, preferably at least 25%, more preferably at least 50%, more preferably at least 75%, more preferably at least 100% of the respective value for trans-resveratrol. According to one embodiment, the L-ORAC, H-ORAC and Total-ORAC (using the Total-ORAC$_{FN}$) values can be determined according to the method of Brunswick Laboratories, Inc., Southborough, MA 01772, USA. According to one embodiment the ORAC method according to Y. Sueishi et al, J Clin Biochem Nutr. 2012 March; 50(2):127-32 may be used. Preferably, antioxidant used has a Trolox equivalent unit of at least 0.1, more preferably at least 0.2, more preferably at least 0.5, more preferably at least 0.75.

In addition, a container with a coating comprising antioxidant surprisingly efficiently suppresses or minimizes quality deterioration of the packaged consumable good, in particular due to oxidation.

A container according to the present invention surprisingly assists in maintaining and even improving the quality and/or longevity of the consumable good. Surprisingly we found that using antioxidant in a container of the invention not only afforded protection for the consumable good from the container material but it enhances the beneficial effects in the consumable good. It is assumed—without being bound to this theory, that the antioxidant is involved in beneficial interation between the container (inner surface) and the consumable good, and may also neutralize of replace harmful substances otherwise present on the surface of the container wall, such as oxygen, other oxidants or aggressive substances.

The present invention is useful for the packaging of any consumable good which may interact or react with the packaging material or with compounds present in the container, such as air or in particular oxygen, leading to degradation and decomposition of the packaging material and/or the packaged good and ultimately to spoilage of the consumable good.

A problem of spoilage of the consumable good by the packaging material arises if the consumable good reacts with the inner coating of the container, making it important to prevent degradation and decomposition of the packaging material.

It was surprisingly found by the inventors that antioxidant as part of the coating of the inner wall of a container is able to protect from and prevent this degradation and decomposition.

While not wishing to be bound by theory, it is assumed that according to one embodiment of the invention, antioxidant present in the coating of the container may function as a component active at the surface of the coating facing and in contact with the consumable good, as well as in the coating (which may also act as a reservoir of antioxidant releasable over a prolonged time) and in the consumable good upon migration from the coating into the consumable good.

It was observed that antioxidant may have additional desirable functions as part of the invention such as suppression of undesired reactions or degradations of the consumable good in the container. Thus, e.g. excessive growth of microorganisms can lead to deterioration of taste, aroma and integrity of a comestible. Furthermore, metabolites of microorganisms can aggravate the problem of breakdown of the packaging material.

By creating a kind of barrier having the positive effects of antioxidant we have surprisingly found that it protects the consumable good and enhances its stability and longevity.

According to one aspect of the present invention, it is advantageous that antioxidant is present in the coating of the container before the addition of a consumable good to the container. According to this embodiment, the container of the invention refers to an empty container prior to filling with the consumable good. According to one embodiment, the container of the invention is an unused container, i.e. has never been used before for filling with a consumable good. This way a barrier having the protective functions as laid out above is provided along the inner wall of the container e.g. to fend off the aggressive, corrosive, acidic and oxidizing components of the consumable good and to provide a protective and beneficial surface of the coating from the very beginning, i.e. at the time of filling the container. According to one embodiment of this invention, this initial protection is particularly important to keep the coating layer intact from the first contact with the consumable good but will also safeguard long-term quality and excellence of the consumable good.

In a preferred embodiment of the present invention, the coating layer comprises antioxidant in a concentration of at least 0.0001 weight %, preferably at least 0.001 weight %, more preferably at least 0.01 weight %, even more preferably at least 0.1 weight %, even more preferably at least 1 weight %, even more preferably at least 10 weight %, even more preferably at least 30 weight %.

In another preferred embodiment of the present invention, the coating layer comprises antioxidant in a concentration of at most 70 weight %, preferably at most 30 weight %, more preferably at most 10 weight %, even more preferably at most 1 weight %, even more preferably at most 0.1 weight %, even more preferably at most 0.01 weight %, even more preferably at most 0.001 weight %.

In a particularly preferred embodiment of the present invention, the coating layer according to the present invention comprises antioxidant in a concentration of from 0.0001 to 10 weight %, in one more preferred embodiment from 0.1 to 5 weight %, preferably 0.5 to 1 weight %, in another more preferred embodiment from 0.001 to 0.05 weight %, preferably 0.005 to 0.01 weight %.

According to one embodiment of the invention, the above weight-% ranges are based on the total weight of the coating layer comprising the antioxidant. If more than one coating layer is present in the container, according to one embodiment of the invention the above weight-% ranges are based on the total weight of all coating layers. According to another embodiment of the invention, the above weight-% ranges are based on the total weight of only the coating layer comprising the antioxidant.

According to one aspect of the present invention, the concentration of antioxidant may also differ through the cross-section of the coating layer. For example, according to one embodiment, the concentration of antioxidant at or close to the surface of the coating layer facing the consumable good may be higher than in the parts of the coating further distanced from this surface. This way, the protective effect on the surface of the coating layer may be improved according to one embodiment of the invention, e.g. in unused containers before being filled with the consumable good so that an advantageous protective layer is present when the consumable good is filled into the container. According to another embodiments, the opposite concentration profile may be preset and may provide a longer lasting reservoir of antioxidant in the coating layer.

The container according to the present invention provides the producers and packers of consumable goods, with an improved way of packaging their goods.

The antioxidant-containing internal barrier and its application method may be part of an overall packaging system that has the capability to be applied to any container during the normal container manufacturing process.

Furthermore, the container according to the present invention can allow transporting the finished product comprising a sensitive consumable good in non-refrigerated sea-containers therefore minimizing the carbon footprint.

In a preferred embodiment, the container comprises or is made of metal, polymer material such as a plastic material, paper, cardboard, glass or combinations thereof, in a more preferred embodiment aluminium. The present invention is useful for the storage of any consumable good as mentioned herein, including those which are acidic, corrosive, oxidative or able to react in any way with the packaging material, and those which are sensitive to environmental factors and compounds present in the container. As stated above, the term container as used herein comprises any packaging or packaging material for consumable goods in rigid or flexible form. The containers may have any suitable form or shape for packaging the respective goods. The container may be e.g. without limitation a can, a bag, a can, canister, tank, bowl, flask, cask or the like. According to one embodiment, the container is a packaging for a medicament. According to one embodiment, the container can also be in the form of a blister package and the antioxidant may be present on a metal foil and/or a plastic foil of the blister package.

In a preferred embodiment of the present invention the coating layer acts as a two-way barrier. A two-way barrier should be understood in the context of the present invention to not only protect the consumable good from undesired interaction with the packaging material leading to deterioration or change of the quality of the consumable good. In addition, this barrier should also protect the packaging material from undesired interaction with the consumable good leading to potential damage of the container or its integrity.

According to several aspects of the invention, the containers, processes and uses according to the invention can inter alia reduce the probability of food poisoning (especially from canned food) or increase the shelf life of the product (longevity and stability of the product). They can also help to achieve various suitable transportation conditions for the packaged consumable goods over several global climatic conditions. They may further decrease the need for preservatives such as salt/sodium based preservatives, or e.g. sorbic acid as a preservative in canned food. They can e.g. also prevent deleterious corrosion effects on the container or a lining thereof. In many instances, they may maintain or stabilize the natural flavour profile or enhance the natural flavour of comestibles as consumable goods. The formation of free radicals may be reduced whereby e.g. the reduction/elimination of the formation of unwanted bacteria in food is achieved. Consequently the probability of infection may be reduced. For pharmaceutical products, the stability and quality can be increased.

According to one embodiment, in principle, all coating compositions or lacquers known to the person skilled in the art can be used within the present invention for the coating layer(s). Examples for general methods for the preparation and application of exemplary layers are disclosed in EP 2457840 A1, "Packaging Materials 7. Metal Packaging for Foodstuffs" (Publication of the ILSI Europe Packaging Materials Task Force, September 2007, accessible at https://europa.eu/sinapse/sinapse/index.cfm?fuseaction=lib.attachment&lib_id=C5C03DA0-ED72-0D54-309D55AA14F6C62F&attach=LIB_DOC_EN) or "Preliminary Industry Characterization: Metal Can Manufacturing—Surface Coating" (Publication of the U.S. Environmental Protection Agency, September 1998, accessible at http://www.epa.gov/ttnatw01/coat/mcan/pic-can.pdf).

Coating compositions and layers for metal and non-metal surfaces are known to the skilled person. The composition is chosen by the skilled person in relation to the surface properties and adhesiveness of the metal or non-metal surface, and the compatibility with the consumable good to be packaged. A preferred non-metal material (surface) for the application of the antioxidant-containing layer is a polymer or plastic surface. Antioxidant can be easily added prior, during or after formation of the layer.

Lacquers which have previously been used for an inner coating (coating layer) of containers such as aluminium cans were predominantly based on Bisphenol A (BPA)-containing compounds such as epoxy resins. According to one embodiment of the present invention, the use of Bisphenol A or Bisphenol A-releasing substances in the coating layer of a beverage container is avoided. According to one particular embodiment, the coating layer should not contain any of the following potentially hazardous substances: formalin, potassium permanganate (KMnO4), dibutyl phthalate (DBP), bis(2-ethylhexyl) phthalate (DEHP), diisobutyl phthalate (DIBP), dimethyl phthalate (DMP), diethyl phthalate (DEP), bis(2-ethylhexyl) adipate (DEHA), diisodecyl phthalate (DIDP), diisononyl phthalate (DINP).

In another embodiment, the lacquer does not contain epoxy resins, in a further embodiment the coating layer does not contain bisphenol A or bisphenol A-releasing substances.

In another preferred embodiment, the coating layer is a thermoset coating layer.

In one preferred embodiment, the lacquer according to the present invention meets all USFDA regulations or other national food safety regulations, in particular the lacquer is food grade. Such lacquers are known to the skilled person and are available on the market. All available lacquers can be used within the present invention.

The thickness of the coating layer of the container according to the present invention should preferably be selected such that aggressive elements in a consumable good do not come into contact with the container material, and that the layer provides sufficient protection of the good to be packaged. According to the present invention, an extended shelf life and enhanced product integrity can be obtained.

In a preferred embodiment, the thickness of the coating layer on the inner surface of the container is in the range of between about 3.5 to about 8.4 grams per square meter, in a more preferred embodiment in the range of about 4.0 to about 8.0 grams per square meter, in a most preferred embodiment in the range of about 5.0 to about 8.0 grams per square meter. In another embodiment, the thickness of the coating layer and/or container wall can be from about 0.1 μm to 10 mm, in particular from about 1 μm to 1 mm.

In one preferred embodiment, the coating layer is consistently distributed throughout the entire inner wall of the container so that the inner wall is integrally coated with the layer containing antioxidant.

In another preferred embodiment, the coating layer comprising antioxidant is a non-permeable layer, i.e. the coating layer comprising antioxidant is non-permeable for the consumable good to prevent the interaction of the consumable good with the packaging material.

According to one embodiment of the present invention, the wall of the container for a consumable good may comprise one or more layers. If the wall of the container consists only of one layer, according to one embodiment of the present invention, this one layer, i.e. the wall of the container may comprise the antioxidant. In other words, the coating layer then is the wall of the container. One example of such an embodiment of the invention is a container made of a one-layer plastic foil sealed together to form a kind of bag for the consumable good such as a ready-to-use meal. The wall of the container, i.e. the one-layer plastic foil then comprises the antioxidant and is at the same time the wall of the container.

According to a preferred embodiment, the coating layer comprising antioxidant is in direct contact with the interior of the container, i.e. the coating layer comprising antioxidant forms the inner surface (or a part of the inner surface) of the container. In other words, there is no additional layer on top of the coating layer comprising antioxidant towards and facing the interior of the container.

According to a preferred embodiment of the invention, the layer comprising the antioxidant (e.g. the coating layer or the wall of the container) is a layer comprising or consisting substantially or completely of polymers. Particularly preferred are polymers which have functional groups capable of interacting with the antioxidant, preferably its OH groups. Non-limiting examples of such polymers are those having functional groups which are capable of forming hydrogen bonds with the antioxidant. Preferred examples of suitable polymers according to the invention are polymers comprising functional groups with O, N, S, Cl or F heteroatoms.

According to one preferred embodiment, all, substantially all or at least a part of the antioxidant comprised in the layer (e.g. the coating layer, or the wall of the container) is not covalently bound to a component of the layer, in particular a polymer present in the layer. The antioxidant not covalently bound may migrate and replenish antioxidant at the inner surface of the container or in the packaged consumable good. On the other hand, bonding and fixing at least a part of the antioxidant to a component of the layer may in some instances help to keep the antioxidant at its preferred location, in particular in direct contact with the packaged good.

In yet another preferred embodiment, the inner wall is partially coated with the coating layer containing antioxidant. For example, the container may only be coated with the coating layer containing antioxidant in areas of the container where the coating is most prone to crack or fail. Alternatively, the inner wall may be coated with spots of coating layer containing antioxidant. These spots may provide enough antioxidant to obtain beneficial effects of the present invention. Areas that are not coated with the coating layer containing antioxidant according to this embodiment may be coated with a different coating layer to prevent the interaction of the consumable good with the packaging material.

A further aspect of the present invention relates to a process for preparing a container for a consumable good as defined above, the process comprising the steps of:
a) providing a container having a container wall having an inner side facing inner space of the container;
b) providing a coating layer on the inner side of the container wall, the coating layer containing antioxidant.

As stated herein, any container suitable to provide an inner space of the container for packaging a consumable good can be used. The container has a container wall and this container wall has an inner side facing the inner space of the container. Any coating layer containing antioxidant as described herein or as deemed suitable by the skilled person may be used. According to one aspect, the container may have only one layer as the container wall, so that the coating layer is at the same time the container wall. Also, additional layers may be provided in the container wall.

According to one further aspect, the present invention further provides a process for preparing a container for a consumable good, comprising the steps of applying an uncured coating layer comprising antioxidant to a surface of a container wall material and curing the uncured coating layer.

The uncured coating layer can be applied to the container wall material e.g. by standard spray application guns as they are known in the art.

In one embodiment of the invention, the uncured coating layer comprising antioxidant is applied to the surface of a container wall material before the container is formed. The advantage of this embodiment is that the uncured coating layer comprising antioxidant may be applied and distributed more consistently on the surface of the container wall material before the material is formed into a hollow container. In another preferred embodiment, the coating layer comprising antioxidant may be attached or applied to a surface of the container wall material in the form of a film or a foil which is preferably laminated or otherwise bonded to the container wall material before or after forming the container. According to one embodiment of the invention, the coating layer(s) comprising antioxidant are prepared without extensive heating for prolonged times, e.g. by using foils. Also, if curing of the layer(s) is performed, other curing methods apart from heat curing may be used or the time and temperature of heating may be limited.

In another embodiment of the invention, the uncured coating layer comprising antioxidant is applied to the surface of a container wall material after the container is formed. The advantage of this embodiment is that standard containers may be obtained from mass producers and subsequently provided with the coating layer of the present invention to obtain a container having the advantages according to the present invention. Also, according to another embodiment, antioxidant may be added to the composition of a least one of the coating layers and the production process may otherwise remain unchanged.

In one aspect of the invention, antioxidant, e.g. a solution comprising the antioxidant, may be sprayed onto the inner surface of a container comprising a container wall with one or more layers.

In another embodiment, the antioxidant is added, e.g. sprayed on the surface of the coating layer after the coating layer has been applied to the inner wall (or surface) of the container, but before the consumable good is filled into the container. According to a further embodiment the antioxidant is added to the coating layer, e.g. sprayed thereon, after curing of the coating layer, but before the consumable good is filled into the container.

In one preferred embodiment of the present invention, the process comprises the additional step of filling the container with a consumable good. According to one embodiment, this is done after the coating layer comprising antioxidant has been provided at the inner surface of the container.

In the context of the present invention, it should be understood that the inner surface of the container should mean the inner side of the container wall facing the interior of the container. Thus, the container according to the invention has a container wall, e.g. made of metal such as aluminium, and this container wall has an outer side facing the exterior of the container and an inner side facing the interior of the container. The inner side (or surface) of the container, according to one embodiment of the invention, thus may be coated with one or more layers, at least one of which comprises antioxidant. In one embodiment of the present invention, the inner surface of the container (wall) is provided with only one layer (coating layer). This layer comprises antioxidant according to the present invention. In another embodiment of the present invention, the inner surface of the container (wall) is provided with more than one layer. In this case, one or more of the layers may comprise antioxidant.

According to a broad aspect of the invention, the container thus comprises a container wall comprised of one or more layers, wherein at least one layer comprises antioxidant.

According to one embodiment, one or more layers not comprising antioxidant may be present between the layer comprising antioxidant and the container wall. Also, according to one embodiment, one or more layers not comprising antioxidant may be present between the (coating) layer comprising antioxidant and the exterior of the container.

According to another embodiment, one or more layers not comprising antioxidant may be present between the layer comprising antioxidant and the interior of the container, i.e. the cavity of the container in which the consumable good may be filled. According to a further embodiment, the layer comprising antioxidant is the layer directly facing the interior of the container, i.e. is in direct contact with the container cavity or the consumable good, respectively, once the container has been filled with the consumable good.

In one embodiment of the present invention, antioxidant may be contained in any of the layers located inside of the outer aluminium shell (container wall) of the can. In a preferred embodiment, antioxidant is contained only in one or more layers located inside of the outer aluminium shell of the can which are able to interact with the consumable good, either directly or through an additional layer which is permeable for antioxidant and/or the consumable good. In another preferred embodiment, antioxidant is contained in one layer which is able to interact with the consumable good.

In another preferred embodiment, the uncured coating layer comprises free metal radicals. The addition of free metal radicals to the uncured lacquer will reduce the baking and curing temperature as well as the curing time, leading to an additional reduction of energy needed for the packaging of a consumable good in a container according to the invention.

In one embodiment, the uncured coating layer is cured for 80 to 230 seconds at a temperature of from 180 to 250° C., more preferably at from 180 to 220° C.

According to the present invention, it is possible to apply a top coating layer comprising antioxidant to the inside of the container so that the antioxidant-containing layer is in contact with the consumable good.

In yet another preferred embodiment, at least one additional coating layer is present. For example, the bottom layer represents a antioxidant-infused, BPA-free, corrosion resistant coating layer comprising an, in particular water-based, monomer enhancer which drives the antioxidant to the top coating layer which is in contact with the consumable good.

According to one embodiment of the invention, it is ensured that at the final stage of the preparation of the container (i.e. before filling), antioxidant is located on the inner surface in the coating layer of the container which is in contact with the consumable good.

This invention also provides the use of a container as described herein for the storage of a consumable good. In a preferred embodiment, the container is used for the storage of a non-beverage consumable good.

Furthermore, this invention provides the use of antioxidant as an additive to a coating layer, in particular a coating layer on the inner surface of a container, in particular for a consumable good.

All embodiments of the present invention as described herein are deemed to be combinable in any combination, unless the skilled person considers such a combination to not make any technical sense, i.e. where there are conflicting alternatives.

EXAMPLES

Example 1

Preparation of Lacquers (Coating Layers) Containing Antioxidant

Bisphenol A-Free Polyester Acrylate Containing Layer (Prepared According to Example 2 of WO 2008036629 A2)

A 2-liter flask was equipped with a stirrer, packed column, condenser, thermocouple, heating mantle and nitrogen blanket. The following were added to the flask: 498.6 grams of propylene glycol, 80.1 grams of trimethylolpropane, 880.1 grams of terephthalic acid, 40.0 grams of isophthalic acid, and 2.0 grams of FASCAT 9100 butylhydroxyoxostannane catalyst (available from Total Petrochemicals USA, Inc., Houston, USA).

The flask contents were slowly heated to 225° C. to 235° C. under a nitrogen blanket, and the water from the resulting polycondensation reaction was distilled off. Once the reaction mixture became clear and the temperature at the head of the column dropped, the reaction mixture was cooled to 160° C., and 85.5 grams of isophthalic acid and 16.0 grams of maleic anhydride were added to the flask. The reaction mixture was slowly reheated under a nitrogen blanket to 220° C. to 230° C.

Once the reaction mixture became clear and the temperature at the head of the packed column dropped, the reaction mixture in the flask was cooled to 200° C., the packed column replaced with a Dean & Stark column for azeotropic distillation, and 30.0 grams of xylene were added to the flask. The contents of the flask were reheated under a nitrogen blanket to reflux temperature, and more reaction water was distilled off until the acid number of the reaction mixture fell below 5. The contents of the flask were cooled to 145° C. to 150° C., and 744.6 grams of butyl glycol, 104.7 grams of n-butanol, and 219.6 grams of xylene were then added to form a solution of dissolved Polyester.

A 5-liter flask was equipped with a stirrer, reflux condenser, thermocouple, heating mantle, and nitrogen blanket. A sample of the solution of dissolved Polyester prepared as described above (1782.0 grams) and butyl glycol (123.0 grams) were placed in the 5-liter flask and preheated under nitrogen blanket to 120° C. In a separate flask, 321.0 grams of ethyl acrylate, 68.3 grams of glacial acrylic acid, 96.1 grams of styrene and 11.9 grams of VAZO 67 free radical initiator (2,2'-azobis(2-methyl-butyronitrile, available from Du Pont de Nemours, Wilmington, DE, USA) were premixed. The mixture of monomers and initiator was then added to the polyester solution over a period of 135 minutes under a nitrogen blanket and at a temperature of 120° C.-122° C. The temperature in the 5-liter flask was then maintained for 1 hour at 122° C.

Following this, 2.6 grams of TRIGONOX C free radical initiator (tert-butyl peroxybenzoate, available from Akzo Nobel) were added to the 5-liter flask, and the reactor temperature was maintained for 2 hours at 122° C. The reaction mixture was then cooled to 105° C., and a premix containing 150.3 grams of dimethylethanolamine and 150.3 grams of demineralized water was added to the 5-liter flask over a 10-minute period, followed by a hold of 10 minutes. The reaction mixture dropped in temperature to 90° C. at the end of the addition. Finally, 2554 grams of water were added to the 5-liter flask over a 30-minute period, and the solution of the polyester acrylate inverted into an aqueous dispersion of the Polyester Acrylate.

A 60% solution of VARCUM 2227 phenolic resin (211 grams) (Reichhold Corporation, Durham, USA) was incorporated in the inverted polyester acrylate resin that was at a temperature of about 60° C. after the final water addition to the polyester acrylate resin had been completed. This VARCUM 2227 resin addition was followed by a hold of 20 minutes.

The aqueous dispersion of Polyester Acrylate Phenolic contained 29.8 wt-% solids (nonvolatile matter), based on the total weight of the aqueous dispersion of Polyester Acrylate Phenolic, as determined by heating a 1-gram sample of the aqueous dispersion of Polyester Acrylate Phenolic for 60 minutes at a temperature of 150° C. The aqueous dispersion of the Polyester Acrylate Phenolic had a pH of 8.53 standard pH units at a temperature of about 20° C.

To 70.43 parts of polyester acrylic phenolic resin as prepared above under stirring were added 14.40 parts deionized water and a premix consisting of 0.022 part CYCAT 600 aromatic sulphonic acid, 10.75 parts w-butanol, and 2.57 part CYMEL 303 hexamethoxymethymelamine. To the resulting composition under stirring was added 0.17 parts Carnauba Wax emulsion and 0.65 part BACOTE 20 AZC (MEL Chemicals, Manchester, UK; diluted 10% in water). The resulting product is suitable for spray application on the interior and beverage cans and crosslinks at high temperature.

In the following Examples, however, Valspar 40Q60AA (available from The Valspar Corporation, Minneapolis, USA) was used as the Bisphenol A-free Polyester Acrylate containing layer (Lining A). To illustrate the effect of the present invention, the Bisphenol A-free Polyester Acrylate containing layer was prepared without the addition of antioxidant, or with the addition of 0.001 wt %, 0.01 wt % and 0.1 wt % of antioxidant (catechin or Vitamin E) directly to the solution suitable for spray application.

Epoxy-Acrylate Containing Layer (Prepared According to Example 18 of WO 2008036629 A2)

A 5-liter flask was equipped with a stirrer, reflux condenser, thermocouple, heating mantle, and nitrogen blanket. Low molecular weight liquid epoxy and bisphenol A were charged to the reactor plus butyl tri-phenyl phosphonium bromide catalyst and xylene. A Nitrogen purge was carried out and heat was applied initially, after which an exotherm raised the temperature in the reactor.

A target weight per epoxy value of around 2900-3100 was achieved in a typical reaction time of 6 hours. Butyl glycol, n-butanol, and amyl alcohol solvents were then added slowly over a 90-minute period. Acrylic monomers styrene, and methacrylic acid plus benzoyl peroxide initiator LUCIDOL 78 (available from Akzo Nobel, Amsterdam, The Netherlands) were then added to a monomer addition tank. After stirring, the acid number of this monomers/catalyst pre-mix was checked. The monomers/catalyst were then slowly added to the hot epoxy solution and the acrylic polymerization took place. The epoxy acrylic resin solution was then cooled and discharged from the reactor into a thinning tank containing a solution of water and diaminoethanolamine. The epoxy acrylic solution formed a dispersion in the water by inversion.

To 76.02 parts epoxy acrylic resin dispersion as prepared above was added with stirring, 18.82 parts deionized water, 3.68 parts w-butanol, and a premix consisting of 0.25 parts dimethylaminoethanol and 1.23 parts deionized water. The resulting product was suitable for spray application on the interior of beverage cans and crosslinked at high temperature.

In the following Examples, however, Aqualure 900 (available from Akzo Nobel, Amsterdam, The Netherlands) was used as the Epoxy-Acrylate containing layer (Lining B). To illustrate the effect of the present invention, the Epoxy-Acrylate containing layer was prepared without the addition of antioxidant, or with the addition of 0.001 wt %, 0.01 wt % and 0.1 wt % antioxidant (catechin or Vitamin E) directly to the solution suitable for spray application.

Example 2

Application of Antioxidant-Containing Coating Layer to Packaging Material/Container Wall (Before/After Forming of the Container)

The lacquers as described in Example 1 are applied to the aluminium can as a coating layer by using a twin gun to coat the internal wall and dome of the can. The amount of lacquer to be applied depends on the size of the can to be coated. In this Example, cans with a volume of 150 to 440 ml have been coated using 100 to 240 mg of Lining A or Lining B containing 0.1 wt % of one of the following antioxidants: catechin, Vitamin E.

The uncured coating layer is cured for 80 to 230 seconds at a bake temperature between 180 and 250° C. The resulting distribution thickness of the layer lies between 3.5 and 8.4 grams per square meter (gsm). The thickness of the film layer is indicated for the top, middle, bottom and dome section of a can coated with Lining A containing 0.1 wt % antioxidant in Table 1.

TABLE 1

| Can size - | Film weight - | Film distribution - gsm | | | |
|---|---|---|---|---|---|
| ml | mg | Top | Middle | Bottom | Dome |
| 150 | 100 | 5.8 | 5.8 | 6.7 | 6.4 |
| 200 | 120 | 5.6 | 5.8 | 5.7 | 5.2 |
| 250 | 170 | 6.9 | 7.2 | 7.1 | 6.2 |
| 300 | 180 | 6.1 | 5.9 | 6.1 | 6.0 |
| 330 | 200 | 6.3 | 6.4 | 5.8 | 5.5 |
| 375 | 215 | 6.0 | 6.6 | 6.6 | 6.7 |
| 440 | 230 | 6.0 | 6.9 | 6.3 | 5.9 |

Example 3

Assessment of Physical Parameters of Coated Cans

The cans obtained in Example 2 were examined for adhesion of the coating layer (AS 1580 Method 408.4), impact resistance at 18 Joule (AS 1580 Method 406.1), pinholing after incubation in HCl for 5 minutes (SSL test method). They were further examined microscopically for blistering (AS 1580 Method 481.1.9), delamination (AS 1580 Method 481.1.10) and corrosion (AS 1580 Method 481.3). The performance of the can in all tests was excellent and the integrity of the coating layer was maintained. Results of these tests are shown in Table 2.

TABLE 2

| Test | Test Method | Result |
|---|---|---|
| Adhesion Cross Cut | AS 1580 Method 408.4 Rating 0 = no removal of coating 5 = complete removal of coating | 0, 0, 0 Av = 0 |

TABLE 2-continued

| Test | Test Method | Result |
|---|---|---|
| Impact Resistance Reverse Impact | AS 1580 Method 406.1 | No failure of coating at 18 Joule (1.8 kgf m) |
| Pinholing | SSL Test Method Can filled with HCl and allowed to stand for 5 minutes. Points of hydrogen evolution observed. Microscopic examination | 0 pinholes / can |
| Blistering | AS 1580 Method 481.1.9 | Rating 0 (no blistering) |
| Delamination | AS 1580 Method 481.1.10 | Rating 0 (no delamination) |
| Corrosion | AS 1580 Method 481.3 | Rating 0 (no corrosion) |

Example 4

Organoleptic Assessment of Packaged Red Wine

Red wines were packaged in 250 ml slimline cans as obtained in Example 2 (antioxidant: Vitamin E) and then stored for 24 months. Organoleptic assessment was done initially, after 3 months, after 6 months, after 12 months and after 24 months. The results of this Example are shown in Table 3.

TABLE 3

| Coating (gsm) | Initial | 3 months | 6 months | 12 months | 24 months |
|---|---|---|---|---|---|
| 6.0 | Clean, fresh; intense berry colour and nose | Sustained full flavour, good nose | Sustained full, rich flavour, good nose | Sustained full flavour, good nose | Sustained full flavour, good nose | gsm = gram per square meter

Example 5

Organoleptic Assessment of Packaged Carbonated White Wine

Carbonated white wines were packaged in 250 ml slimline cans as obtained in Example 2 (antioxidant: Vitamin E) and then stored for 24 months. Organoleptic assessment was done initially, after 3 months, after 6 months, after 12 months and after 24 months. The results of this Example are shown in Table 4.

TABLE 4

| Coating (gsm) | Initial | 3 months | 6 months | 12 months | 24 months |
|---|---|---|---|---|---|
| 6.0 | Clean, fresh Good bubbles/ Mousse | Sustained fresh flavour, vibrant colour and bubbles/ Mousse | Sustained fresh flavour, vibrant colour and bubble/ Mousse | Sustained fresh flavour, vibrant colour and bubble/ Mousse | Sustained fresh flavour, vibrant colour and bubble/ Mousse |

Example 6

Comparative Test of Cans Coated with Commercially Available Lacquers Against can According to the Present Invention Cans as obtained in Example 2 (antioxidant: catechin) are tested against cans lined with commercially available lacquer. Standard cans with comparative lacquers were obtained from the market (Comparison Cans 1 and 2, respectively). All containers were filled with wine and stored for 24 months. Organoleptic assessment was done by a panel of 16 consumers initially, after 6 months, after 12 months, after 18 months and after 24 months. The results of this Example are shown in Table 5 (red wine).

TABLE 5

| Storage | Initial | 6 months | 12 months | 18 months | 24 months |
|---|---|---|---|---|---|
| Inventive can with red wine | Fresh full taste | Fresh full taste | Fresh full taste | Fresh full taste | Fresh full taste |
| Comparison Can 1 with red wine | Fresh full taste | Flat | Poor taste | Foreign taste | Dull taste |
| Comparison Can 2 with red wine | Fresh full taste | Low in fruit flavour | Dull | Chemical foreign taste | Chemical foreign taste |

Example 7

Quality Assessment of Packaged Vegetable and Beef Stew

Fresh vegetable or beef stew was packaged in cans as obtained in Example 2 (coating weight 6 grams per square meter; linings with 0.1 wt % antioxidant catechin) and then stored for 24 months. Organoleptic assessment was done initially, after 3 months, after 6 months, after 12 months and after 24 months. The average storage time without noticeable deterioration in smell taste, texture and appearance of the canned good could be significantly extended in the containers of the invention. The results are shown in Table 6 below.

TABLE 6

| Storage | Initial | 6 months | 12 months | 18 months | 24 months |
|---|---|---|---|---|---|
| Inventive can Catechin | Fresh smell full taste, and firm texture | Fresh smell full taste, and firm texture | Fresh smell full taste, and firm texture | Fresh smell full taste, and firm texture | Fresh smell full taste, and firm texture |
| Comparison Can without Catechin | Fresh smell full taste, and firm texture | Fresh smell full taste, and firm texture | Fresh smell full taste, and firm texture | Unpleasant smell Diminishing taste, and texture | Off smell Diminishing taste, and soft texture |

Example 8

Quality Assessment of a Body Lotion

Similar to Example 7, a commercial body lotion (o/w type; oil in water emulsion) was packaged in cans as obtained in Example 2 (coating weight 10 grams per square meter; linings with 0.1 wt % Vitamin E (tocopherols and tocotrienols)) and then stored at elevated temperature of 36° C. The average storage time without noticeable deterioration in smell, viscosity, texture and appearance of the canned good could be extended significantly in the containers of the invention. The results are shown in Table 7 below.

TABLE 7

| Storage | Initial | 6 months | 12 months | 18 months | 24 months |
|---|---|---|---|---|---|
| Inventive can with Vitamin E | Fresh smell, clear and smooth texture | Fresh smell, clear and smooth texture | Fresh smell, clear and smooth texture | Fresh smell, clear and smooth texture | Fresh smell, clear and smooth texture |
| Comparison Can 1 without Vitamin E | Fresh smell, clear and smooth texture | Fresh smell, clear and smooth texture | Fresh smell, clear and smooth texture | Fresh smell, slightly cloudy and smooth texture | Slight rancid smell. Cloudy. Thickened texture. |

The invention claimed is:

1. An unused container for a consumable good, wherein an inner surface of the unused container, before being filled with the consumable good, is at least partially coated with a coating layer comprising an antioxidant other than resveratrol selected from the group consisting of vitamins, vitamin cofactors, hormones, carotenoid terpenoids, phenols, polyphenols, phenolic acids, phenolic esters, non-flavonoid phenolics, flavonoids, tannins, other organic antioxidants, and mixtures thereof, wherein a concentration of the antioxidant differs through a cross-section of the coating layer, and
wherein the consumable good is selected from the group consisting of food, food ingredients, nutrients, nutrition supplements, beverages, cosmetic products, beauty and health care products, pharmaceutical products, veterinary products, and medicaments.

2. The unused container of claim 1, wherein the antioxidant is selected from the group consisting of vitamin A, beta-carotene, carotenoids, provitamin A, vitamin C, vitamin E and mixtures thereof.

3. The unused container of claim 1, wherein the antioxidant comprises a flavonoid.

4. The unused container of claim 1, wherein the antioxidant is selected from the group consisting of retinol, retinoic acid, provitamin A carotenoids and mixtures thereof.

5. The unused container of claim 1, wherein the antioxidant is selected from the group consisting of vitamin cofactors, hormones, carotenoid terpenoids, stilbenoids, and mixtures thereof.

6. The unused container of claim 1, wherein the antioxidant is selected from the group consisting of vitamin A, beta-carotene, carotenoids, provitamin A, vitamin C, vitamin E and mixtures thereof.

7. The unused container of claim 1, wherein the antioxidant is selected from the group consisting of Vitamin E and catechin.

8. The unused container according to claim 1, wherein the coating layer comprises the antioxidant in a concentration of at least 0.0001 weight %, and
wherein the coating layer comprises the antioxidant in a concentration of at most 30 weight %.

9. The unused container of claim 1 wherein at least one additional coating layer is present between the coating layer comprising the antioxidant and a container wall of the unused container.

10. The unused container of claim 1 wherein the concentration of the antioxidant in the coating layer at or close to a surface of the coating layer facing the consumable good to be added to the unused container is higher than in sections of the coating layer further distanced from the surface of the coating layer.

11. The unused container according to claim 1, wherein the thickness of the coating layer on an inner surface of the container is in the range of between about 4.0 to 8.0 grams per square meter.

12. A process for preparing an unused container for a consumable good comprising:
  a) providing the unused container comprising a container wall comprising an inner side facing an inner space of the container; and
  b) before filling the unused container with the consumable good, providing a coating layer on the inner side of the container wall, wherein the coating layer comprises an antioxidant other than resveratrol selected from the group consisting of vitamins, vitamin cofactors, hormones, carotenoid terpenoids, phenols, polyphenols, phenolic acids, phenolic esters, non-flavonoid phenolics, flavonoids, tannins, other organic antioxidants, and mixtures thereof, wherein a concentration of the antioxidant differs through a cross-section of the coating layer;
wherein the consumable good is selected from the group consisting of food, food ingredients, nutrients, nutrition supplements, beverages, cosmetic products, beauty and health care products, pharmaceutical products, veterinary products, and medicaments.

13. The process of claim 12 wherein the antioxidant is selected from the group consisting of vitamin A, beta-carotene, carotenoids, provitamin A, vitamin C, vitamin E and mixtures thereof.

14. The process of claim 12 wherein the antioxidant is selected from the group consisting of Vitamin E and catechin.

15. The process of claim 12 wherein the antioxidant is selected from the group consisting of retinol, retinoic acid, provitamin A carotenoids and mixtures thereof.

16. The process of claim 12 wherein the antioxidant is selected from the group consisting of retinol, retinoic acid, provitamin A carotenoids and mixtures thereof.

17. The process of claim 12 wherein the antioxidant is selected from the group consisting of vitamin cofactors, hormones, carotenoid terpenoids, stilbenoids, and mixtures thereof.

18. The process of claim 12 wherein step b) further comprises applying an uncured coating layer comprising an antioxidant to the surface of the container wall and curing the uncured coating layer.

19. The process according to claim 12, wherein the process further comprises filling the container with the consumable good.

20. The process of claim 12 wherein the concentration of the antioxidant in the coating layer at or close to a surface of the coating layer facing the consumable good to be added to the unused container is higher than in sections of the coating layer further distanced from the surface of the coating.

* * * * *